United States Patent
Mirski et al.

(10) Patent No.: US 8,943,592 B1
(45) Date of Patent: Jan. 27, 2015

(54) METHODS OF DETECTION OF SOFTWARE EXPLOITATION

(71) Applicant: ESET, spol. s.r.o., Bratislava (SK)

(72) Inventors: Pawel Mirski, Szczecin (PL); Peter Hlavaty, Bratislava (SK); Peter Kosinar, Bratislava (SK)

(73) Assignee: ESET, Spol. s.r.o., Bratislava (SI)

( * ) Notice: Subject to any disclaimer, the term of this patent is extended or adjusted under 35 U.S.C. 154(b) by 9 days.

(21) Appl. No.: 13/942,385

(22) Filed: Jul. 15, 2013

(51) Int. Cl.
- G06F 15/16 (2006.01)
- G06F 15/173 (2006.01)
- G06F 15/177 (2006.01)
- G06F 21/56 (2013.01)

(52) U.S. Cl.
CPC .................................... G06F 21/566 (2013.01)
USPC .................. 726/23; 726/24; 726/25; 726/26; 726/27; 709/224

(58) Field of Classification Search
USPC ............................... 726/22–27; 709/217–224
See application file for complete search history.

(56) References Cited

U.S. PATENT DOCUMENTS

| | | | |
|---|---|---|---|
| 6,212,566 B1 * | 4/2001 | Vanhoof et al. | 709/230 |
| 6,351,847 B1 * | 2/2002 | Sakamoto et al. | 717/127 |
| 6,934,950 B1 * | 8/2005 | Tuel et al. | 718/102 |
| 7,099,949 B1 * | 8/2006 | Vanhoof et al. | 709/230 |
| 7,308,083 B2 * | 12/2007 | Bettis et al. | 379/88.17 |
| 7,526,805 B2 * | 4/2009 | Chu et al. | 726/22 |
| 7,584,509 B2 * | 9/2009 | Wu et al. | 726/27 |
| 7,650,640 B1 | 1/2010 | Levy | |
| 7,721,340 B2 * | 5/2010 | Wu et al. | 726/27 |
| 7,966,426 B2 * | 6/2011 | Smith et al. | 709/248 |
| 7,975,029 B2 * | 7/2011 | Sakamura et al. | 709/220 |
| 8,037,536 B2 * | 10/2011 | Treadwell et al. | 726/25 |
| 8,065,734 B1 * | 11/2011 | Kennedy | 726/23 |
| 8,181,251 B2 * | 5/2012 | Kennedy | 726/23 |
| 8,185,610 B2 * | 5/2012 | Goff et al. | 709/219 |
| 8,307,435 B1 | 11/2012 | Mann et al. | |
| 8,479,286 B2 * | 7/2013 | Dalcher et al. | 726/22 |
| 8,677,492 B2 * | 3/2014 | Rusakov | 726/24 |
| 2009/0300764 A1 | 12/2009 | Freeman | |
| 2012/0254993 A1 | 10/2012 | Sallam | |

(Continued)

FOREIGN PATENT DOCUMENTS

WO 2011057393 A1 5/2011

OTHER PUBLICATIONS

Article entitled Ending The Love Affair with ExploitShield; by: Andrew Ruff; Dated Oct. 29, 2012; http://blog.trailofbits.com/2012/10/.

(Continued)

Primary Examiner — Haresh N Patel
(74) Attorney, Agent, or Firm — Hovey Williams LLP

(57) ABSTRACT

A method for detecting software exploitation broadly comprises the steps of gathering information about processes and threads executing on a computing device, monitoring instructions executed by a thread that is currently running, performing the following steps if a function to create a process or a function to load a library is called, examining a thread information block, determining whether an address included in a stack pointer of the thread is in a range of addresses for a stack specified by the thread information block, and determining whether a first plurality of no-operation instructions is followed by shell code that is followed by a second plurality of no-operation instructions.

5 Claims, 3 Drawing Sheets

(56) References Cited

U.S. PATENT DOCUMENTS

2012/0311708 A1 12/2012 Agarwal et al.
2013/0055369 A1 2/2013 Kumar et al.

OTHER PUBLICATIONS

Kaspersky Lab; Automatic Exploit Prevention Technology;http://www.kaspersky.com/downloads/pdf/kaspersky_lab_whitepaper_automatic_exploit_prevention_eng_final.pdf; Copyright: 1997-2012.

F-Secure Exploit Shield protects against "zero-day" vulnerability exploits; http://www.computerworld.com.au/article/271409/f_secure_exploit_shield_protects_against_zero-day_vulnerability_exploits/; Dated: Dec. 18, 2008.

* cited by examiner

US 8,943,592 B1

METHODS OF DETECTION OF SOFTWARE EXPLOITATION

BACKGROUND OF THE INVENTION

1. Field of the Invention

Embodiments of the current invention relate to the detection of malicious computer software.

2. Description of the Related Art

Software exploitation, also known as computer viruses, malware, spyware, adware, worms, and the like, is utilized by an attacker to gain access to a user's computer system in order to obtain sensitive information, monitor the activities of the user, or control the operation of the system. The exploitation often occurs when the user receives data from other parties or external systems such as while browsing the Internet or receiving email. The exploitation may take advantage of security defects in the programming of applications such as web browsers or email readers.

SUMMARY OF THE INVENTION

Embodiments of the current invention solve the above-mentioned problems and provide a distinct advance in the art of the detection of malicious computer software.

A first embodiment of the invention provides a method for detecting software exploitation broadly comprising the steps of gathering information about processes and threads executing on a computing device, monitoring instructions executed by a thread that is currently running, performing certain steps if a function to create a process or a function to load a library is called. The steps performed may include examining a thread information block, determining whether an address included in a stack pointer of the thread is in a range of addresses for a stack specified by the thread information block, and determining whether a first plurality of no-operation instructions is followed by shell code that is followed by a second plurality of no-operation instructions.

A second embodiment of the invention provides a method for detecting software exploitation broadly comprising the steps of gathering information about processes and threads executing on a computing device, monitoring instructions executed by a thread that is currently running, performing certain steps if a function to create a process or a function to load a library is called. The steps performed may include examining a plurality of items on a stack, determining instructions that placed items on the stack, determining whether the instructions include valid subroutine calls, and determining whether the instructions are located in an address space for executable code.

A third embodiment of the invention provides a method for detecting software exploitation broadly comprising the steps of gathering information about processes and threads executing on a computing device, monitoring instructions executed by a thread that is currently running, performing certain steps if a function to create a process or a function to load a library is called. The steps performed may include examining a plurality of items on a stack, examining a chain of exception handlers, each exception handler including a first address pointing to the next exception handler and a second address pointing to instructions for handling an exception, and determining for each exception handler whether the second address is located in an address space for executable code.

A fourth embodiment of the invention provides a method for detecting software exploitation broadly comprising the steps of gathering information about processes, threads, and applets executing on a computing device, monitoring instructions executed by processes, threads, and applets that are currently running, monitoring any file that is created by the applets, determining whether the file is being executed as an additional process, and determining whether the file is being loaded as a library.

A fifth embodiment of the invention provides a method for detecting software exploitation broadly comprising the steps of gathering information about processes, threads, and applets executing on a computing device, monitoring instructions executed by processes, threads, and applets that are currently running, utilizing a programming interface, and determining whether a system.setsecuritymanager(null) call is made followed by a processbuilder.start( ) call.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein.

Figure 1:
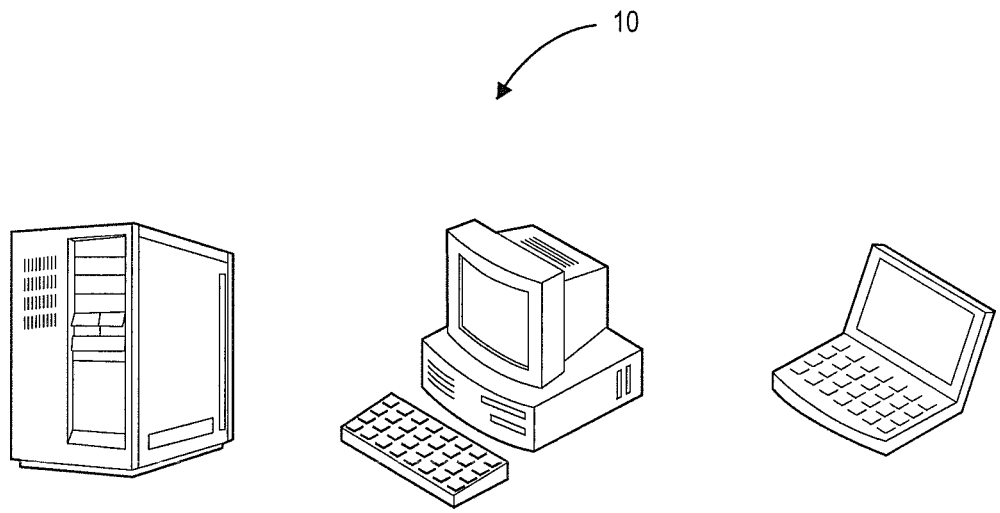
FIG. 1 is a view of a plurality of computing devices for detecting software exploitation, as constructed in accordance with various embodiments of the current invention.

The drawing figures do not limit the current invention to the specific embodiments disclosed and described herein. The drawings are not necessarily drawn to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Figure 2:
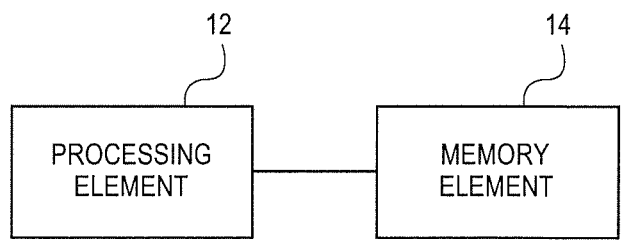
FIG. 2 is a block schematic diagram of a processing element and a memory element, which are components of the computing devices of FIG. 1.

Computing devices 10 for detecting software exploitation, constructed in accordance with various embodiments of the current invention, are shown in FIG. 1. The computing devices 10 may include devices such as a server computer, a desktop computer, a work station computer, a laptop computer, and the like. Certain embodiments of the current invention may be implemented in hardware, firmware, software, or combinations thereof. Each computing device 10 may comprise a processing element 12 coupled with a memory element 14, as shown in FIG. 2.

The processing element 12 may include processors, microprocessors, microcontrollers, digital signal processors (DSPs), field-programmable gate arrays (FPGAs), analog and/or digital application-specific integrated circuits (ASICs), and the like, or combinations thereof. The processing element 12 may generally execute, process, or run instructions, code, code segments, software, firmware, programs, applications, apps, processes, services, daemons, or the like, or may step through states of a finite-state machine.

Typically, the processing element 12 comprises processors with an x86 type architecture that includes components such as general purpose registers, index registers, segment registers, base pointers, stack pointers, and the like. The processing element 12 may utilize an instruction set that includes instructions from the x86 instruction set. Furthermore, the processing element 12 may execute a Windows®-based operating system, produced by the Microsoft Corporation in Redmond, Wash., although other operating systems are also possible.

The memory element 14 may include data storage components such as read-only memory (ROM), programmable ROM, erasable programmable ROM, random-access memory (RAM), hard disks, floppy disks, optical disks, flash memory, thumb drives, universal serial bus (USB) drives, and the like, or combinations thereof. The memory element 14 may include, or may constitute, a "computer-readable medium" or "computer-readable storage medium" that is non-transitory in nature. The memory element 14 may store the instructions, code, code segments, software, firmware, programs, applications, apps, services, daemons, or the like that are executed by the processing element 12. The memory element 14 may also store settings, data, documents, sound files, photographs, movies, images, databases, and the like. The processing element 12 may be in communication with the memory element 14 through address busses, data busses, control lines, and the like.

The memory element 14 may include a physical address space and at least a portion of a virtual address space and may be used to implement a file system. The memory element 14 may also be utilized to form one or more stacks, one or more heaps, and other data storage structures. A stack may include a plurality of data storage units (typically memory address locations) that operate as a last-in, first-out (LIFO) component. The stack may include a top address and a bottom address. The stack typically stores data associated with function and subroutine calls. A stack pointer may be used in conjunction with the stack, such that the stack pointer usually contains the address of the next available location in the stack. A heap may include a plurality of data storage units that operate as a random-access storage area. The heap may be utilized for processing of data that is input from users or other sources.

Figure 3A:
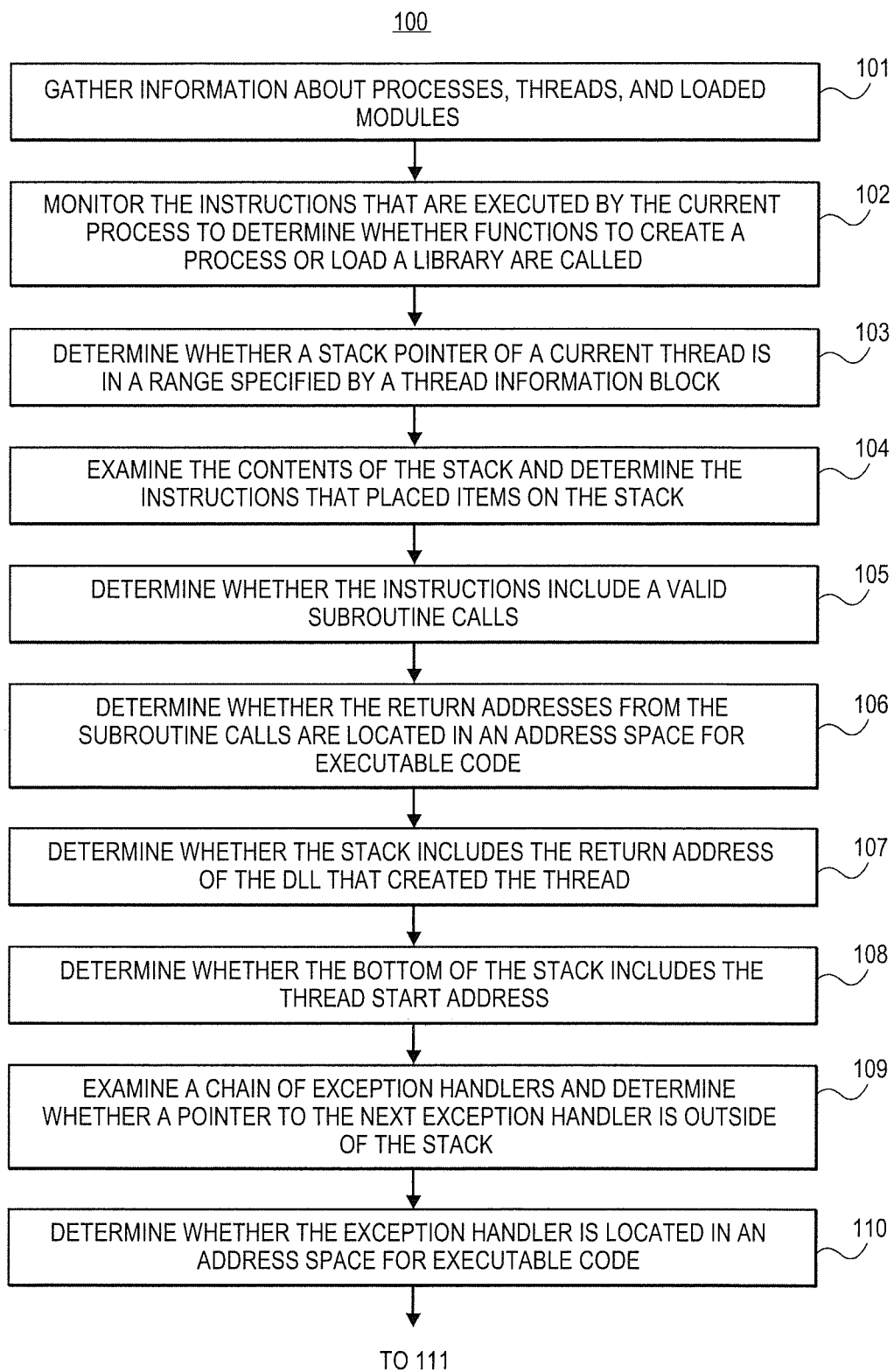
FIG. 3A is a flow diagram of a first portion of the steps of a method for detecting software exploitation in accordance with another embodiment of the current invention.
Figure 3B:
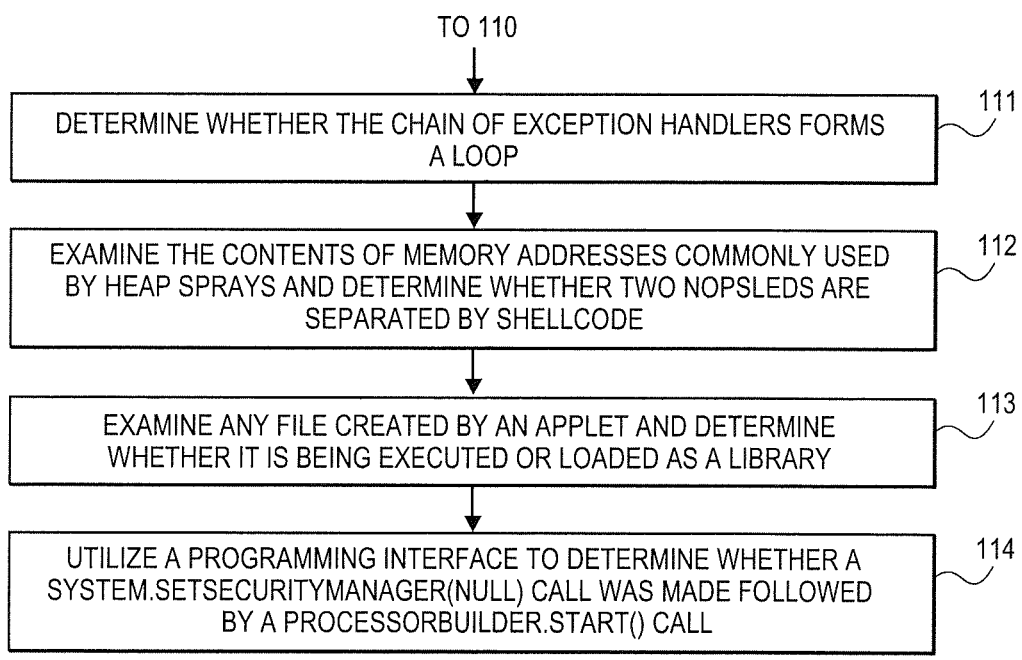
FIG. 3B is a flow diagram of a second portion of the steps of the method of FIG. 3A.

At least a portion of the steps of a method 100 for detecting software exploitation, in accordance with an embodiment of the current invention, is shown in FIGS. 3A and 3B. The method 100 may be partially or wholly implemented as a program that is generally stored in the memory element 14 on a computer-readable medium and executed by the processing element 12 in the computing device 10 when the computing device 10 is powered on. Typically, a user is not aware that the method 100 is executing. The method 100 may be included in at least one process that is running continuously on the computing device 10, although portions of the method 100 may be executed only when certain events occur. For example, some steps of the method 100 may be executed only when a running application attempts to execute another application, load a dynamically linked library (DLL), or perform a similar action that introduces new code to be executed. The steps may be performed in the order as shown in FIGS. 3A and 3B, or they may be performed in a different order. Furthermore, some steps may be performed concurrently as opposed to sequentially. In addition, some steps may be omitted.

With reference to step 101, information is gathered about currently running processes, threads, and loaded modules. A process may be an instance of a program or application that is running. Threads and modules may be portions of a program, and each program may include a plurality of both threads and modules. In various embodiments, the method 100 gather information about all processes that are currently running. In other embodiments, the method 100 may gather information about processes that receive data from or communicate with sources external to the computing device 10, such as a local, metro, or wide area network, or the Internet. For example, the method 100 may gather information about Internet access or browsing programs, electronic mail programs, or the like. Each process, thread, and module may include an executable code section and a data section. The information gathered may include information that is available in a thread information block (TIB), also known as a thread environment block (TEB), which is created by the operating system. The TIB may include data such as a pointer to a structured exception handling frame, addresses of the top and the bottom of the stack, identification data (e.g., process ID, thread ID), and the like. This information is specific to each thread and does not change during the execution of the thread.

The information gathered may also include a list of modules that are components of each process along with an address range or position of the code section and the data section of each module within the virtual address space assigned to the process. The information on modules may also include the location of the module in the file system. This information may be utilized to exclude certain applications from being subjected to other steps of the method so as to avoid any potential false positive exploitation detection results. The information gathered may further include a list of exported functions from each module and their addresses within the code section of the module.

With reference to step 102, the instructions that are executed by the current process are monitored to determine whether functions to create a process or load a library are called. Examples of the functions include "CreateProcess" and "LoadLibrary" that are used in a Windows®-based programming environment. If either function is called, then at least a portion of the remaining steps of the method is performed.

With reference to step 103, the stack pointer of the current thread is examined to determine whether it is pointing outside of the range specified in the TIB. The range of virtual address locations for the stack of the current thread may be listed in the TIB. If the stack pointer contains an address that is not within the TIB listed range, then it may be noted in an internal log that the address in the stack pointer pointed outside of the range listed in the TIB. In some embodiments, a message may also be displayed to the user that a possible exploit has been detected. In other embodiments, the call to create a new process or to load a library may be automatically blocked, or the process may also be terminated. Unless the process is terminated, at least a portion of the remaining steps of the method 100 are performed to provide additional analysis. If the stack pointer includes a valid address within the TIB listed range, then at least a portion of the remaining steps of the method 100 are performed.

With reference to step 104, the contents of the stack are examined and the instructions that placed items on the stack are determined. Typically, when a process calls a subroutine, several items are placed on the stack between boundaries known as a frame. The frame is created when the subroutine is called and destroyed when the subroutine is complete. At least one of the items in the frame is a return address to which the flow of execution returns after the subroutine is complete. Usually, the return address is directly after the address of the command that called the subroutine.

With reference to step 105, the method 100 determines whether the instructions include valid subroutine calls. The command or instruction at the address before the return address may be examined. Since subroutines may call other subroutines, the return address in each frame, starting with the most recent one, is followed to examine the instruction at the address before the return address. If any of the instructions is not a valid subroutine call, then it may be noted in an internal log that at least one instruction the addresses before return addresses is not a valid subroutine call. In some embodiments, a message may also be displayed to the user that a possible exploit has been detected. In other embodiments, the call to create a new process or to load a library may be automatically blocked, or the process may also be terminated. Unless the process is terminated, at least a portion of the remaining steps of the method 100 are performed to provide additional analysis. If all of the instructions in the addresses before return addresses are valid subroutine calls, then at least a portion of the remaining steps of the method 100 are performed.

With reference to step 106, the method 100 determines whether the instructions are located in an address space for executable code. The return address in each frame is examined. If any return address is not in an executable code section of the process, then it may be noted in an internal log that at least one return addresses is not located in an executable code section. In some embodiments, a message may also be displayed to the user that a possible exploit has been detected. In other embodiments, the call to create a new process or to load a library may be automatically blocked, or the process may also be terminated. Unless the process is terminated, at least a portion of the remaining steps of the method 100 are performed to provide additional analysis. If all of the instructions in the return addresses are located in valid executable code sections, then at least a portion of the remaining steps of the method 100 are performed.

With reference to step 107, the method 100 determines whether the stack includes the return address of the DLL that created the thread. Typically, this may be NTDLL.dll, although other dynamic link libraries may be used. If the return address is not found, then it may be noted in an internal log that the return address of the DLL that created the thread was not found. In some embodiments, a message may also be displayed to the user that a possible exploit has been detected. In other embodiments, the call to create a new process or to load a library may be automatically blocked, or the process may also be terminated. Unless the process is terminated, at least a portion of the remaining steps of the method 100 are performed to provide additional analysis. If the return address of the DLL that created the thread is found, then at least a portion of the remaining steps of the method 100 are performed.

With reference to step 108, the method 100 determines whether the bottom of the stack includes the address of the start of the thread. If the bottom of the stack does not include the address of the start of the thread, then it may be noted in an internal log that the bottom of the stack does not include the thread start address. In some embodiments, a message may also be displayed to the user that a possible exploit has been detected. In other embodiments, the call to create a new process or to load a library may be automatically blocked, or the process may also be terminated. Unless the process is terminated, at least a portion of the remaining steps of the method 100 are performed to provide additional analysis. If the bottom of the stack does include the thread start address, then at least a portion of the remaining steps of the method 100 are performed.

With reference to step 109, a chain of exception handlers is examined and it is determined whether any exception handler is outside the stack. An exception handler is a set of instructions for handling unusual situations during the execution of a process, such as performing an indeterminate math function, receiving unexpected data from the user, or the like. Typically, the exception handlers are stored on the stack in a linked list fashion. Thus, each exception handler may include a pointer to the set of executable instructions, in the executable code section, as well as a pointer to the next handler. The method 100 may determine whether all pointers to the next handler point within the stack. If any pointers to the next handler point outside of the stack, then it may be noted in an internal log that a pointer to the next exception handler in the chain of exception handlers points outside of the stack. In some embodiments, a message may also be displayed to the user that a possible exploit has been detected. In other embodiments, the call to create a new process or to load a library may be automatically blocked, or the process may also be terminated. Unless the process is terminated, at least a portion of the remaining steps of the method 100 are performed to provide additional analysis. If all of the next exception handler pointers point inside the stack, then at least a portion of the remaining steps of the method 100 are performed.

With reference to step 110, the method 100 determines whether all of the pointers to the exception handler set of executable instructions are located in the executable code section. If any exception handler pointer does not point to the executable code section, then it may be noted in an internal log that at least one exception handler pointer does not point to the executable code section. In some embodiments, a message may also be displayed to the user that a possible exploit has been detected. In other embodiments, the call to create a new process or to load a library may be automatically blocked, or the process may also be terminated. Unless the process is terminated, at least a portion of the remaining steps of the method 100 are performed to provide additional analysis. If all of the exception handler pointers point to the executable code section, then at least a portion of the remaining steps of the method 100 are performed.

With reference to step 111, the method 100 determines whether the chain of exception handlers forms a loop. In other words, it is determined whether any pointers to the next exception handler point to previous exception handlers. If so, then it may be noted in an internal log that a pointer to the next exception handler in the chain of exception handlers points to a previous exception handler. In some embodiments, a message may also be displayed to the user that a possible exploit has been detected. In other embodiments, the call to create a new process or to load a library may be automatically blocked, or the process may also be terminated. Unless the process is terminated, at least a portion of the remaining steps of the method 100 are performed to provide additional analysis. If none of the next exception handler pointers point to previous exception handlers, then at least a portion of the remaining steps of the method 100 are performed.

With reference to step 112, the memory addresses commonly used by heap sprays are examined and the method determines whether two nopsleds are separated by shellcode. A heap spray is a technique that places a certain sequence of instructions at a predetermined location in the address space. Exemplary predetermined addresses may include 0x09090909 and 0x00000C0C. The instructions may include a plurality of no operation (NOP) instructions that form a "nopsled" or a "nopslide". Heap spraying may further involve placing a first nopsled followed by shellcode followed by a second nopsled. The shellcode may include commands that an attacker wishes to execute. If two nopsleds are found that are separated by shellcode, then it may be noted in an internal log that two nopsleds have been found that are separated by shellcode. In some embodiments, a message may also be displayed to the user that a possible exploit has been detected. In other embodiments, the call to create a new process or to load a library may be automatically blocked, or the process may also be terminated. Unless the process is terminated, at least a portion of the remaining steps of the method 100 are performed to provide additional analysis. If the nopsled-shellcode-nopsled sequence is not found, then at least a portion of the remaining steps of the method 100 are performed.

With reference to step 113, any file that is created by an applet is examined to determine whether it is being executed or loaded as a library. The applet may be a subprogram or subprocess that is typically launched by an existing process as opposed to being directly executed by the user. For example, the user may execute a web browser which in turn may launch applets depending on the content of the web page being viewed. An exemplary platform for launching applets is Java™ produced by Oracle Corporation of Redwood Shores, Calif. The applet may create or receive a file to be stored in the file system. If the file is subsequently executed as an additional process or loaded as a library, then it may be noted in an internal log that an applet-created file has been executed or loaded as a library. In some embodiments, a message may also be displayed to the user that a possible exploit has been detected. In other embodiments, the call to create a new process or to load a library may be automatically blocked, or the process may also be terminated. Unless the process is terminated, at least a portion of the remaining steps of the method 100 are performed to provide additional analysis. If the applet-created file is not executed or loaded as a library, then at least a portion of the remaining steps of the method 100 are performed.

With reference to step 114, a programming interface is utilized to determine whether system.setsecuritymanager(null) is called followed by processbuilder.start( ). The programming interface may allow a process to inspect the state of and control the execution of applications running in a Java™ Virtual Machine, which is a run-time environment in which Java™ byte code can be executed. An exemplary programming interface is the Java™ virtual machine tool interface (JVMTI). The function system.setsecuritymanager(null) may remove or turn off Java™ security measures for the process. The function processbuilder.start( ) may create a new process instance. If these two functions are called in succession, then it may be noted in an internal log that system.setsecuritymanager(null) was called followed by processbuilder.start( ) In some embodiments, a message may also be displayed to the user that a possible exploit has been detected. In other embodiments, the call to create a new process or to load a library may be automatically blocked, or the process may also be terminated. If the functions are not called, then no further actions may be taken.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A non-transitory computer-readable storage medium with an executable program stored thereon for detecting software exploitation, wherein the program instructs a processing element to perform the following steps:
   gathering information about processes and threads executing on a computing device;
   monitoring instructions executed by a thread that is currently running; and
   performing the following steps when a function to create a process or a function to load a library is called:
      examining a thread information block,
      determining whether an address included in a stack pointer of the thread is in a range of addresses for a stack specified by the thread information block,
      examining the contents of a plurality of memory addresses,
      determining whether a first plurality of no-operation instructions is followed by shell code that is followed by a second plurality of no-operation instructions, and
      displaying a message to a user that a possible software exploit has been detected when the address included in the stack pointer is not in the range of stack addresses.

2. The computer-readable storage medium of claim 1, wherein the information includes the starting address of the thread.

3. The computer-readable storage medium of claim 1, wherein the program further comprises the step of recording in an internal log that the address included in the stack pointer is not in the range of stack addresses if the address included in the stack pointer is not in the range of stack addresses.

4. The computer-readable storage medium of claim 1, wherein the program further comprises the step of recording in an internal log that the first plurality of no-operation instructions followed by shell code followed by the second plurality of no-operation instructions was detected if the first plurality of no-operation instructions followed by shell code followed by the second plurality of no-operation instructions was detected.

5. The computer-readable storage medium of claim 1, wherein the program further comprises the step of displaying a message to a user that a possible software exploit has been detected if the first plurality of no-operation instructions followed by shell code followed by the second plurality of no-operation instructions was detected.

\* \* \* \* \*

UNITED STATES PATENT AND TRADEMARK OFFICE
CERTIFICATE OF CORRECTION

| | | |
|---|---|---|
| PATENT NO. | : 8,943,592 B1 | Page 1 of 1 |
| APPLICATION NO. | : 13/942385 | |
| DATED | : January 27, 2015 | |
| INVENTOR(S) | : Pawel Mirski, Peter Hlavaty and Peter Kosinar | |

It is certified that error appears in the above-identified patent and that said Letters Patent is hereby corrected as shown below:

Title Page,
Item 71 Applicant should read: ESET, spol. s r.o., Bratislava (SK)
Item 73 Assignee should read: ESET, spol. s r.o., Bratislava (SK)

Signed and Sealed this
Seventh Day of June, 2016

Michelle K. Lee
*Director of the United States Patent and Trademark Office*